3,510,466
POLYMERISATION CATALYSTS
Gabriele Lugli, Alessandro Mazzei, and Walter Marconi, Donato Milanese, Italy, assignors to Snam Progetti S.p.A., Milan, Italy, an Italian company
No Drawing. Filed July 12, 1967, Ser. No. 652,668
Claims priority, application Italy, July 12, 1966, 20,102/66
Int. Cl. C08d *1/12;* C08f *1/58*
U.S. Cl. 260—94.3                                8 Claims

ABSTRACT OF THE DISCLOSURE

A catalyst system for the polymerization of unsaturated compounds is provided which comprises:
(a) a derivative of a transition metal represented by the general formula: $R_nMX_m$, wherein R represents ($\pi$-allylic) or ($\pi$-cyclopentadienyl); M represents a transition metal included within Groups IV to VIII of the Periodic Table; X represents chlorine, bromine or iodine; $m$ represents 0, 1, 2, or 3; and $n$ represents 1, 2, 3 or 4 when R is ($\pi$-allylic) and, when R is ($\pi$-cyclopentadienyl), 2; and
(b) a para-quinone represented by the general formula:

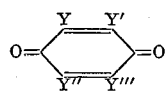

wherein Y represents a member of the group consisting of chlorine, bromine and iodine; Y' represents a member of the group consisting of hydrogen, chlorine, bromine, iodine and a hydrocarbon radical having up to 6 carbon atoms; and Y" and Y''' each represent a member of the group consisting of hydrogen, chlorine, bromine, iodine and a hydrocarbon radical having up to 6 carbon atoms or, together form a carbon atoms ring. The new catalyst system is particularly useful in the production of polybutadiene of high 1.4 cis content.

This invention relates to polymerisation catalyst and is concerned with such catalysts which are suitable for the polymerisation of conjugated dienes.

Transition metal compounds containing $\pi$ alkenyl bonds are well known. Such bonds are formed between electron donor compounds or radicals containing one or more multiple bonds, such as olefins, cyclic olefins, conjugated diolefins and alkenyl radicals, and transition metals or compounds containing transition metals. Examples of these olefin-co-ordination compounds are the cyclopentadienyl complexes, the $\pi$-allyl complexes (e.g. crotyl and methallyl complexes), the cyclooctatetraenyl complexes and the cyclohexenyl complexes of transition metals such as nickel and cobalt. It is also known to use said-co-ordination compounds as catalysts for the dimerization and oligomerization of conjugated dienes. Further it is known that the use of the $\pi$-allyl compounds and Lewis acids produces high polymers from conjugated dienes. As Lewis acids there have been proposed halides such as $AlX_3$ and $TiX_4$ (wherein X represents a chlorine, bromine or iodine atom) $BF_3$, $SnCl_2$, $NiCl_2$ and $WCl_6$. However it is apparent that in order to obtain high molecular polymers of diolefins it is necessary to resort to catalyst systems comprising at least two different metal compounds.

According to the present invention there is provided a catalyst system for use in the polymerisation of an ethylenically unsaturated monomer which comprises:

(i) An olefin-co-ordination compound of the general formula:

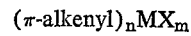

wherein M represents a transition metal of any one of Groups IV to VIII of the Periodic Table, X represents a chlorine, bromine or iodine atom, $m$ is 0, 1, 2 or 3 and $n$ is 1, 2, 3 or 4, and (ii) A para-quinone of the general formula:

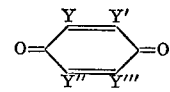

wherein Y represents a halogen atom, Y' represents a hydrogen atom, a halogen atom or a hydrocarbon radical containing not more than 6 carbon atoms, and Y" and Y''' either together represent part of a ring of carbon atoms or each represent a hydrogen atom, a halogen atom or a hydrocarbon radical containing not more than 6 carbon atoms.

By using a catalyst system in accordance with the present invention it is possible to obtain with very high yields butadiene high polymers. Further these catalyst systems comprise only one metallic compound.

Examples of olefin-co-ordination complexes are bis ($\pi$-allyl) Ni; bis ($\pi$-crotyl) Ni; bis ($\pi$-methallyl) Ni; ($\pi$-crotyl NiCl)$_2$; bis ($\pi$-cyclopentadienyl) Ni; bis ($\pi$-cyclooctadienyl) Ni; ($\pi$-allyl)$_2$ CoCl; $\pi$-triphenyl cyclopropenyl NiCl; and ($\pi$-allyl)$_3$ Cr. In the above formula, Y, Y', Y" and Y''' may be chlorine, bromine or iodine. Suitable p-quinones are, for example chloranil (tetrachloro-para-benzo-quinone); bromanil; 2-chloro-p-benzoquinone; 2,6-dibromo-benzo-quinone; 2-chloro-3-methyl benzoquinone; and 2-chloro-3,5-dimethyl benzoquinone.

The catalyst systems according to the present invention are stable with respect to polar solvents such as ethers, alcohols and water which react with the conventional catalysts systems. Further the catalyst systems according to the present invention are not decomposed by unsaturated monomers having other functional groups and therefore they may be usefully employed for the polymerization and copolymerization of conjugated dienes. Thus they are useful in the preparation of butadiene-methyl methacrylate copolymers, butadiene-acrylonitrile copolymers and the like.

In general the catalyst systems of the present invention are useful for the production of high molecular weight polymers from unsaturated compounds and particularly from butadiene. From an industrial point of view the more interesting polybutadienes are those having a high cis 1,4 content i.e. having a cis 1,4 content of at least 85%. Such polybutadienes can be prepared using a catalyst system of the present invention in which the metal of the olefin co-ordination compound is a metal of Group VIII, $m$ in the above formula is 0, 1 or 2 and $n$ in the above formula is 1, 2 or 3. Although the present invention is particularly illustrated with respect to the preparation of high cis 1,4 content polybutadienes it should be understood that other unsaturated compounds can be polymerised using the catalyst systems of the present invention.

The methods of preparing the olefin-co-ordination compounds are well known in the art. For instance, Ni and Co $\pi$-allyl compounds may be obtained from the corresponding metal carbonyl and an allyl halide. More generally the olefin-co-ordination compounds can be prepared by reacting the appropriate transition metal halide and an alkenyl Grignard or a metal carbonyl and an olefin.

In order to obtain the best conversion to a polybutadiene having a high content of cis 1,4 structure, the molar ratio of the olefin-co-ordination compound to the p-quinone should be from 0.5:1.0 to 2.0:1.0. When lower ratios are used the conversion to solid polymer decreases (and the proportion of oligomers produced increases), and on the other hand for higher ratios the catalyst system becomes less effective.

The interaction between the two components of the catalyst system of the present invention and the polymerization reaction preferably take place in solution. Many kinds of solvent may be used for example aliphatic hydrocarbons such as hexane or n-heptane, cyclo aliphatic hydrocarbons, aromatic hydrocarbons such as benzene or toluene, polar solvents such as ethers, e.g. ethyl ether, and mixtures of the abovementioned solvents.

The preparation of the catalyst system may be carried out either in the presence of or in the absence of the monomer to be polymerised. In the absence of the monomer the reaction between the components of the catalyst system takes place with the separation of a brown precipitate and in such a case the subsequent polymerization of the monomer is effected in a heterogeneous phase. On the other hand, if the catalyst components are reacted in the presence of monomer no precipitate is formed but the solution becomes brownish. In this case the polymerization is effected in homogeneous phase. The catalyst system activity, calculated on the basis of the yield of the solid polymer, is generally higher when a catalyst system prepared "in situ" is employed. Catalyst systems prepared in the absence of monomer are preferably aged for some hours in the temperature range of from 0 to 50° C. Under such conditions the precipitation of the brown solid is quantitative. The temperature employed when polymerizing unsaturated monomers using the catalyst system of the present invention is generally in the range of from −20° C. to +80° C., but preferably is from 10 to 50° C. The following examples illustrate the invention.

EXAMPLE 1

Into a bottle of capacity 200 ml. there was introduced, in an inert atmosphere, 50 ml. of anhydrous benzene and 0.5 mmole of chloranil (tetrachloro para benzoquinone) and the bottle was then shaken until complete dissolution had occurred. Then 0.5 mmole of bis $(\pi-C_4H_7)$ Ni as pentane solution were added. ($C_4H_7$ represents a crotyl radical). The bottle was thereafter closed with a neoprene seal provided with a metallic punched cap through which a hypodermic needle could be inserted into the bottle. The mixture was aged with shaking at room temperature for 2 hours after which it turned cloudy due to the formation of a brown precipitate. Thereafter 20 g. of butadiene were introduced into the bottle by means of a hypodermic needle welded to a cylinder containing butadiene. The bottle was then placed in a thermostatically controlled rotating bath at a temperature of 25° C. for 48 hours. Thereafter the contents of the bottle were discharged into ½ liter of methyl alcohol containing 1% of an anti-oxidant. The coagulated polymer obtained was dried under vacuum at room temperature for one night.

The yield of solid polymer was 60% with respect to the monomer introduced. Infrared analysis of the polymer gave the following results: cis 1,4 content—94.5%; trans 1,4 content—3%; 1,2 content—2.5%; total unsaturation 100. The intrinsic viscosity of the polymer measured at 30° C. in toluene was 1.6 dl./g.

EXAMPLE 2

The same catalyst system of Example 1 was prepared in the presence of monomer, by introducing into the bottle in the sequence as written: 50 ml. of anhydrous benzene, 0.5 mmole of chloranil, 23 g. of butadiene and 0.5 mmole of bis $(\pi-C_4H_7)$ Ni, wherein $C_4H_7$ is a crotyl radical. The bottle was closed with a neoprene seal provided with a metalic punched cap as in Example 1, and thereafter 23 g. of butadiene were added thereto via a needle introduced through the cap. Under these conditions no precipitate was formed, the polymerization being effected in a homogeneous phase. The bottle was shaken at 25° C. for 24 hours and thereafter the solid polymer obtained was worked up as in Example 1.

The yield of dried solid polymer was 87% calculated on the basis of the monomer introduced. Infra-red analysis of the polymer gave the following results: 93% 1,4 cis content; 2.5% 1,2 content; 4.5% 1,4 trans content; total unsaturation 100%; $[\eta]^{30°}$ in toluene 1.20 dl./g.

EXAMPLE 3

A π-crotyl nickel chloride olefin-co-ordination compound was prepared by reacting the stoichiometrically required amounts of anhydrous gaseous HCl (as an ether solution) with bis (π-crotyl) Ni. The olefin-co-ordination compound obtained was twice recrystallized from pentane at −80° C. This compound by itself (i.e. in the absence of a co-catalyst) does not polymerize butadiene to produce a high molecular weight polymer as is shown by the following experiment: 50 ml. of anhydrous benzene, 0.5 mmole of the above compound, i.e. $(\pi-C_4H_7)$ NiCl, and 20 g. of butadiene were introduced into a bottle. After 6 days at room temperature some methanol was added to the bottle. No solid polymer was obtained.

EXAMPLE 4

The olefin-co-ordination compound of Example 3 was again prepared by the same procedure, i.e. by being preformed in the absence of monomer. Then 50 ml. of anhydrous benzene, 0.5 mmole of chloranil and, after complete solution, 0.5 mmole of the olefin-co-ordination compound, i.e. $(\pi-C_4H_7)$ NiCl were introduced into a bottle. After being allowed to age for 1 hour at room temperature, 24 g. of butadiene were added thereto. The bottle was maintained for 48 hours at 25° C. in a rotating bath and then the polymer obtained was coagulated with alcohol and dried.

The yield was 83%. Infra-red analysis gave the following results: 94% 1,4 cis content; 3% 1,4 trans content; 3% 1,2 content; total unsaturation 101%. $[\eta]^{30°}$ in toluene=1.5 dl./g.

EXAMPLE 5

In this example bromanil (tetrabromo-parabenzoquinone) was used instead of chloranil. The procedure was the same as that used in Example 1. The amounts of the various reagents used were: 50 ml. of anhydrous benzene, 0.5 mmole of (π-$C_4H_7$) NiCl, 0.5 mmole of bromanil. The catalyst was aged for 1 hour at room temperature, and then 25 g. of butadiene were added thereto. Polymerisation was effected for 48 hours at a temperature of 25° C.

The yield of solid polymer was 73.5% of the structure: 94.5%, 1,4 cis; 3% 1,2; 2.5% 1,4 trans; total unsaturation 99%.

EXAMPLE 6

The procedure of Example 1 was repeated using 2,6-dibromo-para-benzoquinone instead of chloranil and (π-$C_4H_7$) NiCl instead of bis (π-$C_4H_7$) Ni. The amounts of the reagents used were as follows: 50 ml. of benzene, 0.5 mmole of (π-$C_4H_7$) NiCl, 0.5 mmole of 2-6-dibromo-para-benzoquinone. After ageing the catalyst system at room temperature for 1 hour, 31 g. of butadiene were added and polymerization effected for 48 hours at a temperature of 40° C.

The yield of solid polymer was 35%. Infra red analysis of the polymer gave the following results: 93.5% 1,4 cis content; 2.5% 1,2 content; 4% 1,4 trans content; total unsaturation 101%;

$[\eta]^{30°}_{tolueno} = 1.70$ dl./g.

EXAMPLE 7

The procedure described in Example 1 was repeated using 2-chloro-para-benzoquinone instead of chloranil and ($\pi$-C$_4$H$_7$) NiCl instead of bis ($\pi$-C$_4$H$_7$) Ni. The amounts of the various reagents used were: 50 ml. of benzene, 0.5 mmole of $\pi$-crotyl-Ni-chloride, 0.5 mole of 2-chloro-para-benzoquinone.

After ageing the catalyst for 1 hour at room temperature, 25 g. of butadiene were added thereto and polymerization effected for 48 hours at 40° C.

The solid polymer yield was 30%. Infra red analysis showed that the polymer had the structure: 94% 1,4 cis; 2% 1,2; 4% 1,4 trans; total unsaturation 102%

$$[\eta]_{\text{Toluene}}^{30°} = 2.00 \text{ dl./g.}$$

EXAMPLE 8

In this example the catalyst system comprised $\pi$-crotyl Ni bromide and chloranil and was prepared in the presence of the monomer according to the procedure of Example 2. The amounts of the various reagent used were as follows: 50 ml. of benzene, 0.5 mmole of chloranil, 20 g. of butadiene, 0.5 mmole of $\pi$-crotyl-Ni-bromide.

Polymerization was effected for 80 hours at room temperature and the yield of solid polymer was 34%. Infra red analysis of the polymer gave the following results: 93% 1,4 cis; 4.5% 1,4 trans; 2.5% 1,2; total unsaturation 100%.

EXAMPLE 9

In this example the catalyst system comprised ($\pi$-crotyl) Ni-iodide+chloranil and was prepared in the presence of the monomer. The amounts of the various reagents were as follows: 50 ml. of benzene, 0.5 mmole of chloranil, 20 g. of butadiene, 0.5 mmole of $\pi$-crotyl-Ni-iodide. The polymerization time was 60 hours at room temperature and the yield obtained was 10%. Infra-red analysis of the polymer gave the following results: 51% 1,4 cis; 46% 1,4 trans; 3% 1,2. A similar polymerization test, carried out employing $\pi$-crotyl-Ni-iodide in the absence of chloranil gave after 60 hours at room temperature at 12% yield of a polybutadiene with the structure: 85% 1,4 trans; 13% 1,4 cis; 4% 1,2.

EXAMPLE 10

In the following example bis ($\pi$-methallyl) Ni is employed as the olefin co-ordination compound of the catalyst system. This example also illustrates the use of aliphatic solvents in producing a polybutadiene having a mainly 1,4 cis structure. Following the procedure described in Example 1, butadiene was polymerized using a catalyst system comprising bis ($\pi$-methallyl) Ni and chloranil. The amounts of the various reagents used and the polymerization conditions employed were as follows: 50 ml. of anhydrous benzene, 1 mmole of bis ($\pi$-methallyl) Ni, 1 mmole of chloranil. After ageing the catalyst at 50° C. for 2 hours, 25 g. of butadiene were added thereto and polymerization was carried out at a temperature of 50° C., for 35 hours.

A solid polymer was obtained in a yield of 75% and having the structure: 94% 1,4 cis; 3% 1,4 trans; 3% 1,2. The experiment was repeated with the benzene replaced by 50 ml. of anhydrous n-heptane and the following results were obtained: Yield of solid polymer 42%. Structure by infra red analysis: 92.5% 1,4 cis; 4.5% 1,4 trans; 3% 1,2.

EXAMPLE 11

In this example, the catalyst system comprised nickel bis ($\pi$-allyl) and chloranil and it was prepared in the manner described in Example 1, i.e. it was preformed. The amounts of the various reagents were as follows: 50 ml. of benzene, 1 mmole of bis ($\pi$-allyl) Ni, 1 mmole of chloranil. The catalyst system was aged for 2 hours at room temperature and then 22 g. of butadiene were added thereto. Polymerisation was effected for 48 hours at 50° C., the yield of solid polymer being 10%. The polymer had the structure: 88% 1,4-cis; 9% 1,4 trans; 3% 1,2.

EXAMPLE 12

In this example the catalyst system used was preformed and comprised chloranil and ($\pi$-allyl) Ni chloride prepared apart from bis ($\pi$-allyl) Ni and anhydrous gaseous hydrogen chloride. The amounts of the various reagents were as follows: 50 ml. of anhydrous benzene, 1 mmole of chloranil, 1 mmole of ($\pi$-allyl) Ni chloride. After ageing the catalyst system at room temperature for 2 hours, 21 g. of butadiene were added thereto and polymerisation was effected for 60 hours at 40° C. Solid polymer was obtained in a yield of 10% and had the following structure: 92% 1,4 cis; 5% 1,4 trans; 3% 1,2; total unsaturation 99%.

When the experiment was repeated using $\pi$-allyl-Ni-Cl alone (i.e. in the absence of the chloranil co-catalyst) and for a period of 48 hours at 50° C. no coagulated solid polymer could be detected on the addition of methyl alcohol.

EXAMPLE 13

In this example, the catalyst system comprised $\pi$-allyl-Ni-bromide (obtained apart from bis ($\pi$-allyl) Ni and hydrogen bromide) and chloranil was employed. The procedure followed was that described in Example 1. The amounts of the various reagents used were: 50 ml. of benzene, 1 mmole of chloranil, 1 mmole of ($\pi$-allyl) Ni bromide. After ageing the catalyst system for 5 minutes at room temperature, 25 g. of butadiene were added thereto and polymerization effected for 18 hours at 20° C. The yield was 15%. The polymer obtained had the following structure by Infra Red analysis: 92% 1,4 cis; 5% 1,4 trans; 3% 1,2; total unsaturation 98%.

When the experiment was repeated without employing the cocatalyst (i.e. using the ($\pi$-allyl) NiBr alone) there was obtained after 70 hours at 50° C., 5% of a powdery polymer having the following structure: 90% 1,4 trans; 7% 1,4 cis; 3% 1,2.

EXAMPLE 14

In this example, the catalyst system comprised bis ($\pi$-cyclopentadienyl) Ni and chloranil. The amounts of the various reagents used were as follows: 50 ml. of benzene, 1 mmole of bis ($\pi$-cyclopentadienyl) Ni, 1 mmole of chloranil. After ageing the catalyst system in the absence of the monomer for 1 hour at room temperature 20 g. of butadiene were added thereto and polymerization effected for 24 hours at room temperature. A polymer was obtained in a yield of 5% and having the following structure: 90% 1,4 cis; 7% 1,4 trans; 3% 1,2; total unsaturation 100%.

EXAMPLE 15

In this example (and in Example 16) the use of a polar solvent (ethyl ether-benzene mixture) is described. The catalyst system and the procedure used were the same as those of Example 2 i.e. the catalyst system comprised ($\pi$-crotyl) Ni and chloranil. The amounts of the various reagents used were as follows: 25 ml. of ethyl ether, 0.5 mmoles of chloranil in benzene (25 ml.), 20 g. of butadiene, 0.5 mmoles of ($\pi$-crotyl)$_2$ Ni. The polymerization was effected for 70 hours at room temperature and yielded 40% of solid polymer having the following structure by infra-red analysis: 93% 1,4 cis; 4% 1,4 trans; 3% 1,2; total unsaturation 100%.

EXAMPLE 16

In this example the catalyst system comprised ($\pi$-methallyl)$_2$ CoCl and chloranil. ($\pi$-methallyl)$_2$ CoCl was prepared from ($\pi$-methallyl)$_3$ Co and HCl in ethyl ether at −60° C. The temperature of the mixture was allowed to rise to 0° C., and the mixture was introduced into a bottle containing chloranil in benzene and butadiene. The amounts of the various reagents used were as follows: 30 ml. of ethyl ether containing 1 mmole of (π-methallyl)₂ CoCl, 20 ml. of benzene containing 1 mmole of chloranil, 20 g. of butadiene. After a polymerization time of 2 days at room temperature, 6 g. of solid polybutadiene were obtained having the following structure: 70% 1,4 cis; 7% 1,4 trans; 23% 1,2.

When the experiment was repeated using (π-methallyl)₂ CoCl only (i.e. in the absence of the chloranil cocatalyst) no solid polymer was obtained after a period of 100 hours at room temperature.

What is claimed is:

1. A catalyst system for the polymerisation of unsaturated compounds comprising:
   (a) a [π-alkenyl] compound of a transition metal belonging to the Groups IV to VIII according to Mendeleev having the general formula:

$$R_nMX_m$$

wherein R is a member of the group consisting of (π-allylic) and (π-cyclopentadienyl); X is a member of the group consisting of chlorine, bromine and iodine; M is a transition metal selected from the Groups IV to VIII according to Mendeleev; $m$ is 0 to 3; $n$ is 1 to 4 when R is (π-allylic), and, when R is (π-cyclopentadienyl), 2; and
   (b) a para-quinone having the general formula:

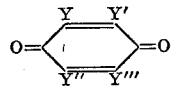

wherein Y represents a member of the group consisting of chlorine, bromine and iodine; Y' represents a member of the group consisting of hydrogen, hydrocarbon radicals having up to 6 carbon atoms, chlorine, bromine and iodine; Y'', Y''' each represent a member of the group consisting of hydrogen, hydrocarbon radicals having up to 6 carbon atoms, chlorine, bromine and iodine and Y'' and Y''' together may form a carbon atoms ring.

2. A catalyst system for obtaining 1.4 cis polybutadiene comprising:
   (a) a derivative of a transition metal belonging to the VIII group of the periodic table having the general formula:

$$R_nMX_m$$

wherein R represents a member of the group consisting of (π-allylic) and (π-cyclopentadienyl); X represents a member of the group consisting of chlorine, bromine and iodine; M is a metal of the VIII Group of Periodic Table; $m$ is 0 to 2; $n$ is 1 to 3 when R is (π-allylic) and, when R is (π-cyclopentadienyl), 2;
   (b) a para-quinone having the general formula:

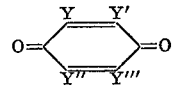

wherein Y represents a member of the group consisting of chlorine, bromine and iodine; Y' represents a member of the group consisting of hydrogen, hydrocarbon radicals having up to 6 carbon atoms, chlorine, bromine and iodine, Y'', Y''' each represent hydrogen, hydrocarbon radicals having up to 6 carbon atoms, chlorine, bromine and iodine and Y''' and Y''' together may form a carbon atoms ring.

3. A catalyst system according to claim 2 wherein said derivative is selected from among bis (π-allyl) Ni, bis (π-crotyl) Ni, bis (π-methallyl) Ni, (π-crotyl NiCl)₂, bis (π-cyclopentadienyl) Ni and (π-allyl)₂CoCl.

4. A catalyst system according to claim 2 wherein the molar ratio between said derivative and paraquinone is between 0.5 and 2.

5. Process for the production of polybutadiene containing at least 85% of 1.4 cis structure in which a catalyst system is employed comprising
   (a) a [π-alkenyl] derivative of a transition metal belonging to the VIII group of the periodic table having the general formula:

$$R_nMX_m$$

wherein R represents a member of the group consisting of (π-allylic) and (π-cyclopentadienyl); X represents a member of the group consisting of chlorine, bromine and iodine; M is a metal of the VIII Group of Periodic Table; $m$ is from 0 to 2; $n$ is from 1 to 3 when R is (π-allylic) and, when R is (π-cyclopentadienyl), 2;
   (b) a para-quinone having the general formula:

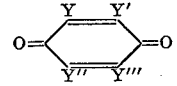

wherein Y represents a member of the group consisting of chlorine, bromine and iodine; Y' represents a member of the group consisting of hydrogen, hydrocarbon radicals having up to 6 carbon atoms, chlorine, bromine and iodine, Y'', Y''' each represent a member of the group consisting of hydrogen, hydrocarbon radicals having up to 6 carbon atoms, chlorine, bromine and iodine and Y'' and Y''' together may form a carbon atoms ring.

6. Process according to claim 5 in which the polymerization reaction takes place at a temperature in the range −20° C. to 80° C. preferably 10° C. to 50° C.

7. Process according to claim 5 in which the reaction takes place in a non-polar solvent selected among alkyl, cycloalkyl and aromatic hydrocarbons.

8. Process according to claim 5 in which the reaction takes place in a polar solvent.

References Cited

UNITED STATES PATENTS

| | | | |
|---|---|---|---|
| 3,424,777 | 1/1969 | Wilke | 260—439 |
| 3,379,706 | 4/1968 | Wilke | 260—943 |

DANIEL E. WYMAN, Primary Examiner

P. M. FRENCH, Assistant Examiner

U.S. Cl. X.R.

260—82.5, 83.5; 252—430, 431